United States Patent [19]

Gerke et al.

[11] 4,375,098

[45] Feb. 22, 1983

[54] DIGITAL TELECOMMUNICATIONS SYSTEM

[75] Inventors: Peter Gerke, Graefelfing; Gerhard Arndt, Holzkirchen; Friedrich Roescheisen, Graefelfing; Heinrich Bruentrup, Munich, all of Fed. Rep. of Germany

[73] Assignee: Siemens Aktiengesellschaft, Berlin and Munich, Fed. Rep. of Germany

[21] Appl. No.: 165,297

[22] Filed: Jul. 2, 1980

[30] Foreign Application Priority Data

Jul. 26, 1979 [DE] Fed. Rep. of Germany ....... 2930420

[51] Int. Cl.³ .............................................. H04J 3/12
[52] U.S. Cl. .................................. 370/110.1; 370/111
[58] Field of Search ................... 370/110, 111, 83, 76, 370/110.1, 110.4

[56] References Cited

U.S. PATENT DOCUMENTS

| 3,686,443 | 8/1972 | Kavanaugh et al. | 370/110 |
| 3,909,540 | 9/1975 | Maryscuk et al. | 370/110 |
| 3,970,798 | 7/1976 | Epenoy et al. | 370/83 |
| 4,045,617 | 8/1977 | Schlichte | 179/15 AT |
| 4,178,483 | 12/1979 | Lager et al. | 370/110 |

OTHER PUBLICATIONS

P. Gerke, International Switching Symposium, 1979, pp. 773-780.
P. Gerke, "Some Points of View Regarding Service-Integrated Digital Communication Networks", Telefon Report, II, (1975), No. 3, pp. 86-90.
Hirschmann et al., "Design Concept and Features of Digital Subscriber Sets", IEEE Proc. 1978 International Zurich Seminar on Digital Communications, pp. D.1-D.4.
Torbergsen et al., "A Digital Subscriber Set", IEEE Proc. 1978 Zurich Seminar on Digital Communications, pp. D2.1-D2.4.
Bowman et al., "Studies for a Subscriber's Telephone Terminal", IEEE Proc. 1978 Zurich Seminar on Digital Communications, pp. D3.1-D3.4.
Weir, D. A., "Proposals for Signalling to and from a Digital Subscriber", IEEE Proc. 1978 Zurich Seminar on Digital Communications, pp. D4.1-D4.6.
Beesley, J. H., "Foundations of System IFS-1", IEEE International Switching Symposium Record, pp. 55-64.
Wuhrmann, K. E., "System IFS-1, The Network Configuration", IEEE International Switching Symposium Record, pp. 65-72.
Gerke, P. R., "Interaction Between Circuit Technology and System Concepts in the Field of Digital Switching", IEEE Proc. 1976 Zurich Seminar on Digital Communications, pp. C1.1-C1.8.
Pfannschmidt, H., "Limitation of Transmission Rate in High-Speed TDM-Switching Networks Using Schottky-TTL Circuit Technology", IEEE Proc. 1976 Zurich Seminar on Digital Communications, pp. C3.1-C3.6.
Graf et al., "Multiplex Equipment DSMX64K/2 and Insertion Unit DSE64K/2 for Digital Transmission", Telecom Report, vol. 2, (1979), pp. 46-51.
"Medium Speed Data Channels over T1 Carrier Systems", by Boxall, Telecommunications, vol. 5, No. 1, Jan. 1971, pp. 26-31, 370-110.1.

*Primary Examiner*—Douglas W. Olms
*Attorney, Agent, or Firm*—Hill, Van Santen, Steadman, Chiara & Simpson

[57] ABSTRACT

In a digital telecommunications system having common 64 kbit/s communications channels in which an additional 8 kbit/s signal channel lying outside of the respective 64 kbit/s common channel is available for outslot signaling only on partial segments of a connection line, for example, only on a subscriber extension circuit, the outslot signaling being carried out on the other connection segments in a subchannel of the 64 kbit/s common channel.

5 Claims, 5 Drawing Figures

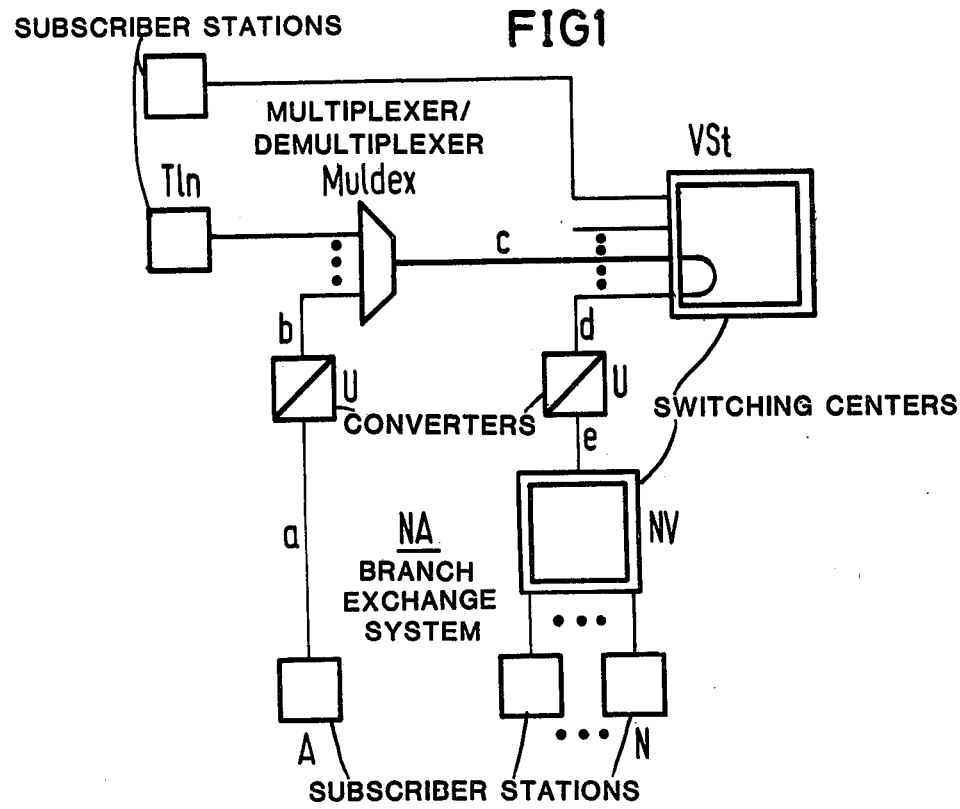
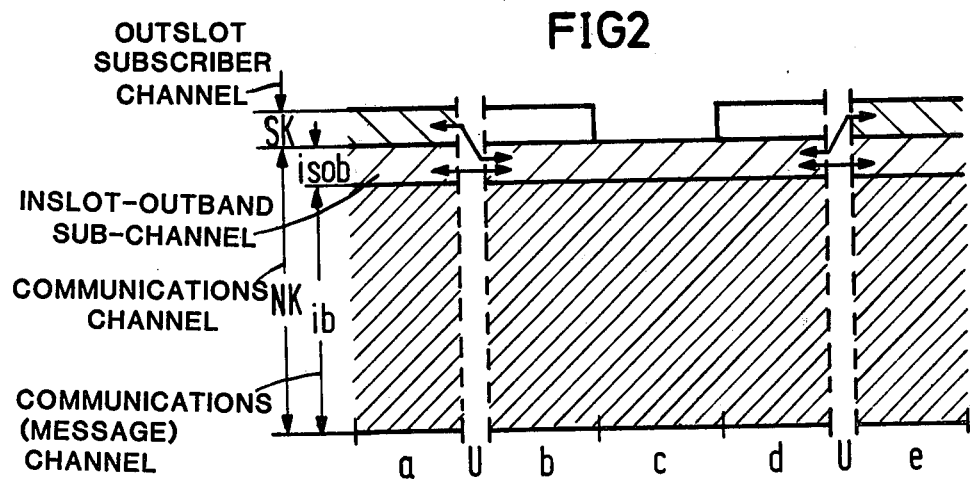

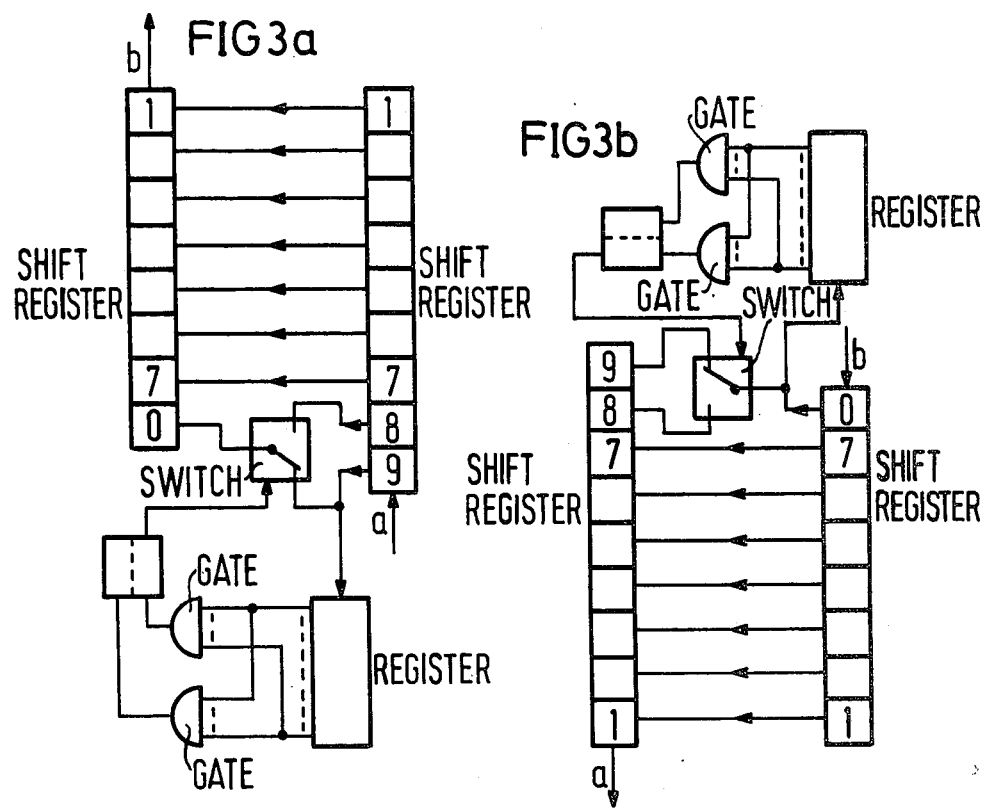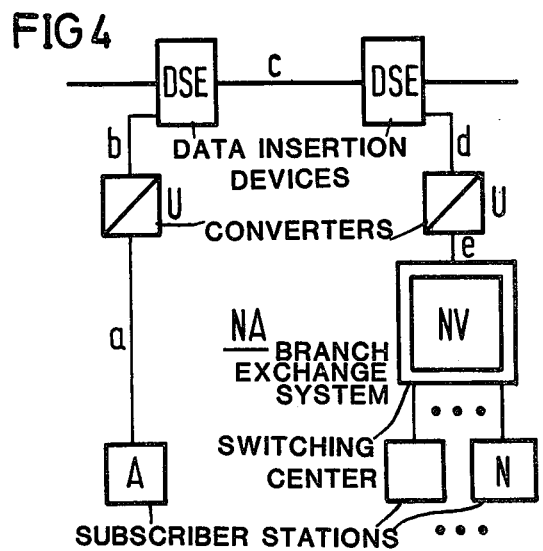

DIGITAL TELECOMMUNICATIONS SYSTEM

BACKGROUND OF THE INVENTION

1. Field of the Invention

The present invention relates to telecommunications systems, and in particular to a digital telecommunications system having outslot signaling in signal channels in addition to the communication channels and which may possibly include additional inslot signaling within a communication channel, and in which, and more specifically, in connection segments of a connection existing between two telecommunications stations on which no outslot signal channel is available, the outslot signaling is transmitted in an inslot-outband-subchannel of the appertaining communications channel.

2. Description of the Prior Art

Newer developments in telecommunications have led to digital telecommunications systems which provide a conversion of the voice signals into digital signals for the telephone subscribers in the subscriber station and in which a digital telephone connection between the subscriber station and the exchange to which the subscriber station is directly connected can be completed by way of a uniform digital communications channel having a bit rate of, for example, 64 kbit/s (per transmission direction) and, moreover, outslot of the 64 kbit/s communications channel a signaling connection for outslot signaling can constantly exist via an additional signal channel with a bit rate of, for example, 8 kbit/s (per transmission direction), whereby, in addition to outslot signaling, inslot signaling can also be provided within the communications channel (International Switching Symposium, Paris, May 11, 1979, pp. 773–780); in addition to speech, text, data and images can be transmitted via digital subscriber terminals in the 64 kbit/s common channels of such a digital telecommunications system.

In such a digital telecommunications system, there is the possibility that, in terms of exchange orientation, certain subscriber stations do not belong to that exchange to which the appertaining subscriber station is directly connected, but, rather, to a different switching center—via a permenent through-connected connection extending via the switching center; such a network configuration can be given, for example, in a service-integrated digital telecommunications system in that data subscriber stations are only indirectly connected to an appertaining data switching center via permanent through-connected connections extending through telephone switching centers (Telefon Report 11 (1975) 3, pp. 86–90).

Such a connection of a subscriber station to the appertaining switching center, which is only indirect, can lead to the fact that only the common, actual communications channel with the bit rate of, for example, 64 kbit/s is available on a part of the overall connection path, not, however, an additional signal channel as well, so that the same signaling procedures and corresponding interface conditions are not possible for subscriber stations directly connected and for subscriber stations indirectly connected, at least not without further provisions; however, identical signaling procedures and interface requirements can be precisely the things which are required, particularly given subscriber stations which are otherwise identical.

SUMMARY OF THE INVENTION

The object of the present invention is to provide a way to do justice to such conditions and to render possible uniform signaling procedures and interface requirements, even when an outslot signal channel is available in addition to the respective communications channel only in partial segments of telephone connections.

The invention relates to a digital telecommunications system with outslot signaling in signal channels provided in addition to the communications channels and possible additional inslot signaling in such a communications channel, and in achieving the above object, the digital telecommunications system, according to the present invention, is particularly characterized in that, in such connection segments of a connection existing between two telecommunications station on which no outslot signal channel is available, the outslot signaling is transmitted in an inslot-outband-subchannel of the appertaining communications channel.

The invention produces the advantage, in a relatively simple manner, and without complicated signaling changes, that an interconnection of connection segments to form a desired connection is also rendered possible when, in individual intermediate connection segments, an additional signal channel which is available in the remaining connection segments is not available in those particular individual intermediate connection segments in addition to the common, through-communications channel; in particular, the invention facilitates the connection of a digital subscriber station to an appertaining switching center via a dedicated transmission circuit extending via intervening multiplex lines and/or digital switching centers.

It should be pointed out at this point that inslot signaling is known per se in the field of audio-frequency signaling upon employing speech blocks; however, problems of an omission of an additional outslot signaling channel are thereby not affected.

In a further development of the invention, the same signaling system can be provided for the outslot signaling as for the inslot-outband signaling; and this produces the advantage that, in a subscriber station, circuit expense to be provided only once for both types of signaling can be employed for the formation of signaling identifiers and for carrying out signaling procedures and, at the same time, a mixture of both types of signaling is facilitated.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is an exemplary embodiment of a digital telecommunications system constructed in accordance with the present invention and illustrated in block form;

FIG. 2 is a graphic illustration of the position and occupation of a communications and signal channel;

FIG. 3a is a logic representation of a code converter which may be employed in practicing the present invention;

FIG. 3b is a logic representation of another code converter which may be employed in practicing the present invention; and FIG. 4 is a schematic block diagram of another embodiment of the invention.

DESCRIPTION OF THE PREFERRED EMBODIMENTS

Referring to FIG. 1, a digital telecommunications system is schematically illustrated, to an extent required for understanding the present invention, as having a digital switching center VSt to which appertaining subscriber stations, such as the subscriber station Tln, are directly connected via a multiplexer/demultiplexer line c, or are also directly connected. The digital switching center VSt, the multiplex line c, the multiplexer/demultiplexer Muldex and the subscriber station Tln can, for example, be a matter of a section of a public digital telephone network for speech and, under certain conditions, also data, text and/or image communications. Connected to a further input/output of the multiplexer/demultiplexer Muldex is a subscriber station A which may be assumed to belong to a different switching center NV which, in turn, is connected to the digital switching center VSt, for example, the switching center of a digital telephone branch exchange NA having further subscriber stations . . . N, the subscriber station A being connected to the switching center NV, however, only indirectly, namely via the multiplex lines c and a permanently through-connected connection in the digital switching center VSt, as illustrated in FIG. 1.

Digital subscriber stations are fundamentally known (for example, from the IEEE Proceedings 1978 INTERNATIONAL ZURICH SEMINAR ON DIGITAL COMMUNICATIONS, pp. D1.1/4 (FIG. 11), pp. D2.1/4 (FIG. 8), pp. D3.1/4 (FIG. 1) and pp. D4.1/6 (FIG. 2)), for which reasons more detailed explanations are not required herein. Digital switching centers are likewise generally known in the art (for example, from U.S. Pat. No. 4,045,617, from the IEEE Conference Record ISS72, pp. 55–64 (FIG. 1), pp. 65–72 (FIG. 1) or from the IEEE Proceedings 1976 INTERNATIONAL ZURICH SEMINAR ON DIGITAL COMMUNICATIONS, pp. C1.1/8, pp. C3.1/6)), for which reasons further detailed discussion is not required herein. The analogous case is true of multiplexers/demultiplexers which are likewise very well known in the art. All of the aforementioned references to the literature are hereby incorporated herein by reference.

For the communications transmission from and to the subscriber stations of the digital switching center VSt, a respective communications channel NK is assumed, as is indicated in FIG. 2, and the same is available with a bit rate of, for example, 64 kbit/s; moreover, a respective additional subscriber signal channel SK, as indicated in FIG. 2, is assumed to be available on the subscriber extension circuits with a bit rate of, for example 8 kbit/s, which additional subscriber signal channel SK can be combined on the multiplex line c with the subscriber signal channels of further subscriber stations in the address multiplex and which serves for the signaling between subscriber station and switching center, and also, under certain conditions, from a subscriber station to a subscriber station outslot of the 64 kbit/s communications channel. Inslot of a 64 kbit/s communications channel NK and outband of the communications or message band ib, it is assumed, as is indicated in FIG. 2, an inslot-outband subchannel isob has a bit rate of, for example, 8 kbit/s is available for signaling purposes, particularly between subscriber stations.

An analogous case applies for the communications transmission and signaling from and to the subscriber station A of the branch exchange system NA when the signaling characters transmitted from or, respectively, arriving at the subscriber station A are converted in the multiplexer/demultiplexer Muldex and processed in the digital switching center VSt, like those of the subscriber stations (Tln) of the digital switching center VSt, whereby connection between the subscriber station A and the appertaining switching center NV of the branch exchange system NA need only be completed in the digital switching center VSt on a respective case-by-case basis, instead of having to be kept constantly through-connected. If, however meantime, such an occupation of the multiplexer/demultiplexer Muldex and of the control of the digital switching center VSt is avoided and, thus, in this example, a corresponding decoupling of the public telephone network and the private branch system is introduced, then an additional signal channel SK (FIG. 2) is not available in the connection segment c for connections of the extension A to the appertaining switching center NV of the private branch system NA.

In order, however, to render the exchange of signaling characters between the extension A and the appertaining switching center NV nonetheless possible without complicated signaling changes, a converter U is connected between the subscriber station A and that input/output of the multiplexer/demultiplexer Muldex connected thereto, the converter U transferring, in the one transmission direction, the signaling characters arising in the additional signal channel SK (FIG. 2) into the inslot-outband-subchannel isob (FIG. 2) of the appertaining communications channel NK (FIG. 2) and, in the other transmission direction, transferring such signaling characters occurring in the inslot-outband-subchannel into the additional signal channel SK. A corresponding converter is inserted between the two switching centers VSt and NV. By so doing, it is achieved that the signaling bit rate of, for example, 8 kbit/s normally transmitted outslot, i.e. outside of the communications channel NK, is now transmitted inslot, i.e. within the communications channel NK, but, in order to avoid an influence of the communications, it continues to be transmitted outband, namely outside of that part ib (FIG. 2) of the 64 kbit/s common channel NK still employed for the actual communications transmission. By so doing, it is possible that, from the very outset, only such a so-called inband part ib of the 64 kbit/s communications channel NK is employed for the actual communications transmission, i.e. only a corresponding bit rate of, for example, 56 kbit/s is provided for the communications transmission. In this case, the outband part isob of the 64 kbit/s communications channel NK extending beyond is generally available for other purposes, thus for signaling from subscriber-to-subscriber, for example, for changing over from speech communications to image communications, which does not further load the telecommunications network. However, it is also possible, as is the case given a pulse code modulation (PCM) speech communications on the basis of a 64 kbit/s transmission channel, that the entire communications channel per se is provided for the actual communications transmission. In this case, a corresponding code conversion is effected at the converter U, the code conversion consisting, in the case of speech communications, only in the suppression or, respectively, the replacement of the least significant bit of a PCM word, whereby one retains an acceptable speech quality.

Such code converters can be designed, for example, in the manner illustrated in FIGS. 3a and 3b. In the circuit arrangement according to FIG. 3a a signal conversion is possible in the transmission direction from a towards b (FIG. 1) upon omission of an additional signal channel SK (FIG. 2), while the circuit arrangement according to FIG. 3b renders possible the reconversion in the transmission direction from b towards a (FIG. 1). Thereby, one proceeds from the fact that the communications channel NK (FIG. 2) and the signaling channel SK (FIG. 2) are chronologically separated from one another in the connection segment a, in that, for example, one bit of the signal channel SK follows each 8 bit group of the communications channel NK. According to FIG. 3a, the 8+1 bits arrive at the bit clock from the line a into a nine-stage shift register 1/ . . . 7/8/9 whose first seven stages 1/ . . . 7 are connected to the first seven stages 1/ . . . 7 of an eight-stage shift register 1/ . . . 7/0; the ninth stage of the nine stage shift register 1/ . . . 7/8/9 is connected to the eighth stage 0 of the eight-stage shift register 1/ . . . 7/0 by way of a switch which is likewise connected to the eighth stage 8 of the nine-stage shift register.

Such a connection via a switch is advantageous when, as explained above, only a 56 kbit/s inband part ib (FIG. 2) of the 64 kbit/s common channel NK (FIG. 2) is employed from the very beginning for the actual communications transmission and the outband portion isob (FIG. 2) of the 64 kbit/s communications channel NK extending beyond that is generally available for other purposes, thus, for signaling from subscriber-to-subscriber. In this case, depending upon which type of signaling (signaling in the outband subchannel isob, i.e. by means of the respective eighth bit, or signaling in the outslot signaling channel SK, i.e. by means of the respective ninth bit) exists at this moment, the switch can be appropriately set, for example, according to the measure of a previously transmitted series of ninth bits accepted by a register and evaluated by means of gates, so that the respective signaling bit arrives in the shift register stage 0.

If, in contrast thereto, the entire communications channel NK per se is provided for the actual communications transmission and the converter, in the case of speech transmission, only effects a code conversion consisting of the suppression of the least significant bit of a PCM word, then it suffices, upon omission of the switch, that the ninth stage 9 of the nine-stage shift register 1/ . . . 7/8/9 be directly connected to the eighth stage 0 of the eight-stage shift register 1/ . . . 7/0. After the 8+1 bit group which serially arrived from the line a into the nine-stage shift register has been transferred in parallel into the eight-stage shift register, a corresponding 7+1 bit group is serially relayed from the eight-stage shift register via the line b.

In the opposite transmission direction, 7+1 bit groups arrive in the bit clock, in the circuit arrangement according to FIG. 3b, from the line b into an eight-stage shift register 1/ . . . 7/0 whose first seven stages are connected to the first seven stages of a nine-stage shift register 1/ . . . 7/8/9. The eighth stage 0 of the eight-stage shift register 1/ . . . 7/0 is connected to the ninth stage 9 of the nine-stage shift register 1/ . . . 7/8/9 via a switch which is likewise connected to the eighth stage 8. As can be seen from FIG. 3b, the switch can be set in a similar manner as was explained above with respect to FIG. 3a, in accordance with the respective signaling type. If the entire 64 kbit/s communications channel is provided for the actual communications transmission, so that, in the case of speech transmission, the converter need only replace the least significant bit of a PCM word, it again suffices, upon omission of the switch, that the eighth stage 0 of the eight-stage shift register 1/ . . . 7/0 be directly connected to the ninth stage 9 of the nine-stage shift register 1/ . . . 7/8/9. After the 7+1 bit group which arrived serially from the line b into the eight-stage shift register has been transferred in parallel into the nine-shift register, a corresponding 8+1 bit group is serially relayed out of the nine-stage shift register by way of the line a.

The converters U of the circuit arrangement according to FIG. 1 make it possible that, despite the omission of the additional signal channel SK (FIG. 2) in the connection segments c, the subscriber station a, which in terms of exchange orientation, belongs to the switching center NV of the private branch system NA can be designed in the same manner as the subscriber station Tln of the digital switching center VSt and that the switching center NV of the private branch system NA can also exhibit a corresponding terminal interface. In addition thereto, it is also indicated in FIG. 2 that the signal channel SK present per se is no longer employed on the connection segments b and d for the transmission of signaling characters. In communications relationships from/to the subscriber stations (Tln) of the digital switching center VSt, on the other hand, upon omission of an additional inslot signaling, the entire communications channel NK can be employed for the actual communications transmission which, in the present example, then proceeds with a bit rate of 64 kbit/s.

In conclusion it should also be pointed out that, deviating from the conditions illustrated in FIG. 1, it is also possible that, as is illustrated in FIG. 4, only a data insertion device DSE respectively inserted in a multiplex line is provided instead of the multiplexers/demultiplexers Muldex and/or the digital switching center VSt, the data insertion device DSE coupling the bit stream from or, respectively, to the subscriber station A or, respectively, the switching center NV into the bit stream of the multiplex line c, or respectively, coupling the bit stream therefrom. By so doing, an even greater decoupling is provided between the public network and the private branch system in the example discussed above. Such a data insertion device can be formed, for example, by means of digital signal insertion devices as are known from Telcom Report 2 (1979) Special Issue "Digital Transmission", pp. 46–51, FIGS. 4 and 5, and are commercially available under the designation DSE 64K/2.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A digital communications system which operates with outslot signaling in outslot signal channels provided outside of the communications band of communications channels and with inslot signaling within a communications channel, comprising:

connection means for establishing a connection between two telecommunication locations including connection segments in a communications channel not having an outslot signal channel; and signaling means operable to provide outslot signaling in an inslot-outband-subchannel within the communications channel and outside of the communications band of the communications channel employed for actual message transmission.

2. The digital communications system of claim 1, wherein:

said signaling means includes common signaling means for both inslot and outslot signaling.

3. The digital communications system of claim 1, comprising:

a pair of code converters each connected between appertaining communications segments and operable, in one transmission direction, to convert signal characters occurring in an additional outslot channel into an inslot-outband-subchannel of the appertaining communications channel and, in the opposite transmission direction, to convert signal characters occurring in the inslot-outband-subchannel into the additional outslot signal channel.

4. The digital communications system of claim 3, comprising:

a multiplexer/demultiplexer included in said communications segments and including input/outputs;

one of said converters connected to one of said inputs/outputs and adapted for connection to a subscriber station;

a multiplex line connected to said multiplexer/demultiplexer included in said communications segments;

a first digital switching center including a permanent through-connection of the appertaining communications channel; and a second digital switching center to which the subscriber station is assigned connected to the subscriber station via the other of said converters, said through-connection of said first digital switching center, said multiplex line and said multiplex/demultiplexer.

5. The digital communications system of claim 3, comprising:

a first data insertion device;

one of said converters connected to said first data insertion device and adapted for connection to a subscriber station;

a multiplex line connected to said first data insertion device and included in said communications segments;

a second data insertion device; and a digital switching center to which the subscriber station is assigned connected to the subscriber station via the other of said converters, said multiplex line and said first data insertion device.

* * * * *